United States Patent [19]

Dubar

[11] Patent Number: 4,630,888
[45] Date of Patent: Dec. 23, 1986

[54] MULTIPLE JOINT FOR UNDERWATER OPTICAL FIBER CABLES

[75] Inventor: Thierry Dubar, Calais, France

[73] Assignee: Les Cables de Lyon, Clinchy Cedex, France

[21] Appl. No.: 621,310

[22] Filed: Jun. 15, 1984

[30] Foreign Application Priority Data

Jun. 15, 1983 [FR] France .................. 83 09865

[51] Int. Cl.⁴ .............................................. G02B 6/44
[52] U.S. Cl. ............................. 350/96.23; 350/96.22
[58] Field of Search ............... 350/96.20, 96.21, 96.22, 350/96.23; 174/705

[56] References Cited

U.S. PATENT DOCUMENTS 4,348,076  9/1982  Oldham ..................... 350/96.22

FOREIGN PATENT DOCUMENTS

| | | | |
|---|---|---|---|
| 3118173 | 11/1982 | Fed. Rep. of Germany . | |
| 56-149011 | 11/1981 | Japan | 350/96.23 |
| 57-26814 | 2/1982 | Japan | 350/96.23 |
| 0019705 | 2/1982 | Japan | 350/96.23 |
| 0078012 | 5/1982 | Japan | 350/96.23 |
| 0130008 | 8/1982 | Japan | 350/96.23 |
| 0136608 | 8/1982 | Japan | 350/96.23 |
| 0142602 | 9/1982 | Japan | 350/96.23 |
| 0787702 | 12/1957 | United Kingdom | 174/705 |

Primary Examiner—John Lee
Assistant Examiner—Vangelis Economou
Attorney, Agent, or Firm—Sughrue, Mion, Zinn, Macpeak and Seas

[57] ABSTRACT

In a multiple joint for underwater optical fiber cables, a first cable termination terminates at least one cable and incorporates a storage chamber for excess lengths of fiber. A connecting member is fastened to the end of said at least one cable, and a first reinforcing member laterally surrounds the first cable termination. A second cable termination terminates at least two parallel cables and incorporates a common connecting member fastened to the ends of each cable, a watertight member adapted to close it off and passages in this watertight member for respective fibers of the cables. There is a storage chamber for excess lengths of fiber on the outside of this watertight member, and a second reinforcing member laterally surrounds the second cable termination. An access cable incorporates fibers from the storage chamber in the first cable termination welded to fibers from the storage chamber in the second cable termination. The access cable is accommodated in a coupling box mechanically linking together the first and second reinforcing members. A watertight insulative coating protects the first and second cable terminations and the access cable.

7 Claims, 4 Drawing Figures

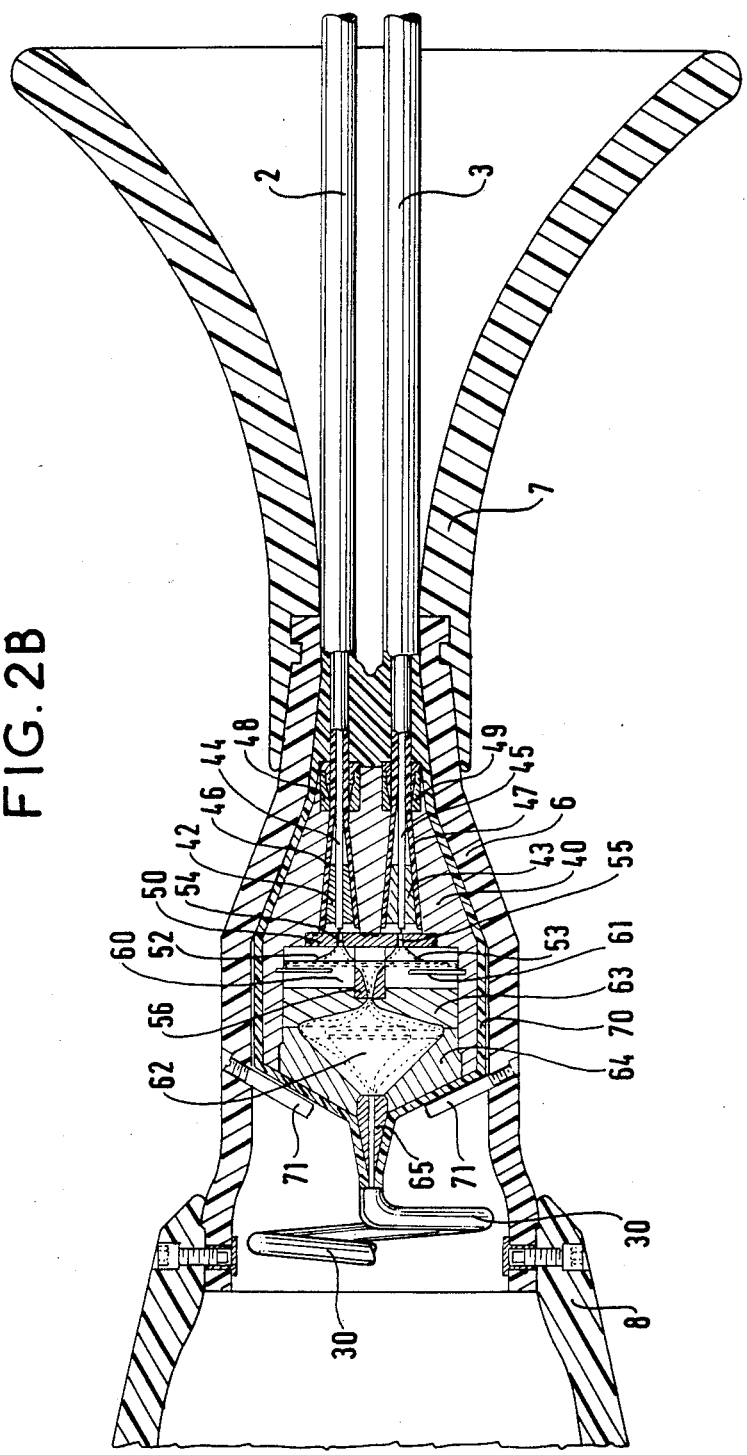

MULTIPLE JOINT FOR UNDERWATER OPTICAL FIBER CABLES

BACKGROUND OF THE INVENTION

Field of the Invention

The present invention concerns a multiple joint for underwater optical fiber cables designed to connect a first cable termination and a second cable termination which terminates at least two cables.

In other words, it relates to a device for distributing the optical fibers of an underwater cable from a first point into two cables extending to two other points with possibly a supplementary connection between said other points.

The objective of the present invention is to propose a joint which is watertight to a pressure of the order of 700 bars and which procures the necessary mechanical continuity and electrical continuity or isolation.

SUMMARY OF THE INVENTION

The present invention consists in a multiple joint for underwater optical fiber cables each comprising an optical core of optical fibers, a strength member of steel wires, a copper tube swaged onto said strength member and an insulative outer sheath, said joint comprising a first cable termination which terminates at least one cable, a storage chamber for excess lengths of fiber in said first cable termination, a respective connecting member fastened to the end of said at least one cable, a first reinforcing member laterally surrounding said first cable termination, a second cable termination which terminates at least two cables disposed parallel to one another, a common connecting member fastened to the ends of each of said at least two cables, a watertight member adapted to close said second cable termination, passages in said watertight member for respective fibers of said at least two cables, a storage chamber for excess lengths of fiber on the outside of said watertight member, a second reinforcing member laterally surrounding said second cable termination, an access cable incorporating fibers from said storage chamber of said first cable termination welded to fibers from said storage chamber of said second cable termination, a watertight insulative coating protecting the combination of said first and second cable terminations and said access cable, and a coupling box mechanically linking together said first and second reinforcing members and accommodating said access cable, wherein fibers of said at least one cable are welded to fibers of said at least two cables.

In one embodiment, said coupling box is made of glassfiber-reinforced plastic and features seawater inlet holes.

Said access cable advantageously comprises, inside said coupling box, a metal electrode welded to the inner conductor of said access cable, whereby said first cable termination is maintained at the same electrical potential as the surrounding seawater; said conductor of said access cable is electrically insulated from said second cable termination, whereby said first and second cable terminations are electrically insulated from one another.

In a particularly advantageous embodiment, said second cable termination comprises a further storage chamber for excess lengths of fiber adjacent the aforementioned storage chamber for excess lengths of fiber and fibers of said at least two cables are welded together after passing through said watertight member and stored in said second storage chamber.

A protection member incorporating a conical internal chamber is fastened to said second reinforcing member and surrounds said at least two cables where they enter said second cable termination.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
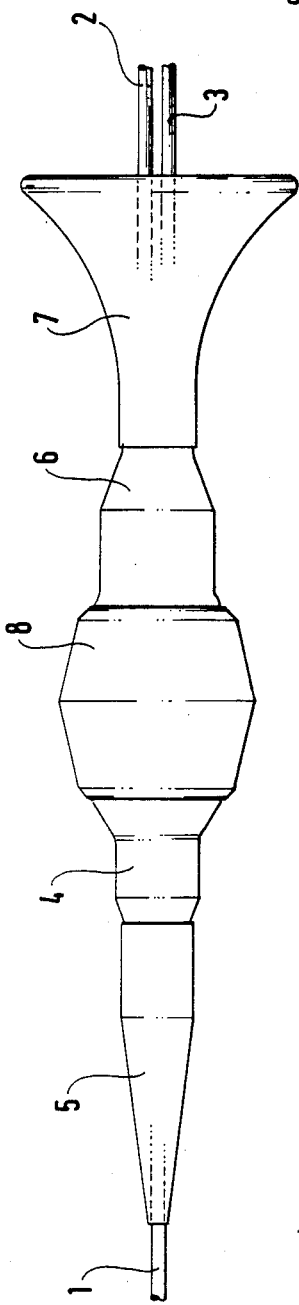
FIG. 1 is a highly schematic view in elevation of a multiple joint in accordance with the invention.

FIG. 1 shows the outside of a joint between a first optical fiber cable 1, a second optical fiber cable 2 and a third optical fiber cable 3.

Part A corresponds to the termination of the first cable equipped with its reinforcing member 4 followed by a conical terminal part 5 protecting the cable 1.

Part B corresponds to the double cable termination carrying the ends of cables 2 and 3, fitted with its reinforcing member 6 and a conical member 7 protecting the cables 2 and 3.

Part C corresponds to the coupling box 8 between the two cable terminations.

The fibers of the cable 1 are connected to the fibers of the cable 2 and to the fibers of the cable 3, but the cables 2 and 3 may have supplementary fibers welded together. In this way it is possible to make connections between cables 1 and 2, between cables 1 and 3 and between cables 2 and 3.

Figure 2A:
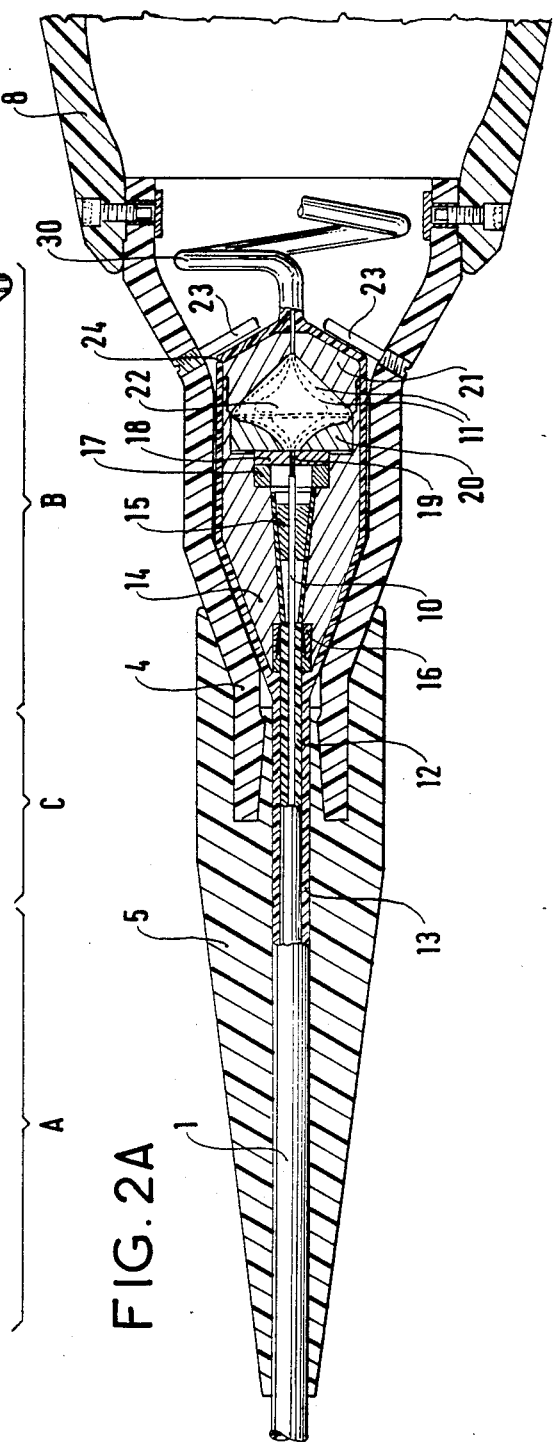
FIG. 2 is a longitudinal cross-section through the joint of FIG. 1 to a larger scale, this figure comprising three sections 2A, 2B and 2C respectively corresponding to the parts A, B and C of the joint as shown in FIG. 1.

FIG. 2A will be further described first.

The cable 1 comprises, in a manner known per se, an optical core 10 containing the optical fibers; this optical core comprises a plastics former reinforced by a steel cable and featuring helical peripheral grooves filled with a viscous product and in which the fibers 11 are accommodated. This assembly is surrounded with one or more plastics tapes and then a sheath of polyvinyl chloride, for example. A strength member 12 of steel wires forming armouring for the optical core is itself sheathed with copper over which is an insulative coating 13. At the end of the cable 1 the optical core is separated from the wires of the strength member 12, which are cut short and accommodated in a conical bore in a connecting member 14; in this they are tightly clamped by a conical ring 15, and the assembly is coated with resin (epoxy resin, for example) to provide tensile strength. A supplementary device 16 for locking the wires of the strength member 12 into the member 14 is disposed in the area where these wires are separated from the optical core, which prevents them unwinding on the inlet side of the conical bore.

A member 18 fitted with seals and associated with a ring 17 closes off the conical bore in a watertight fashion but leaving watertight passages for the glass fibers 11; these are preferably individual to each fiber, but only one passage 19 has been shown, in order to simplify the drawing. The fibers end in a storage chamber 22 formed by two conical members 20 and 21 one at least of which (in this instance the member 21) is screwed into the end part of the connecting member 14. The fibers 11 terminate at the outlet from the storage chamber 22 inside an access cable 30 which will be described later. All the assembly which has just been described is protected by an encapsulation 24 of plastics material, polyethylene, for example, which is linked to the coating 13 of the cable 1. A reinforcing member 4, of glassfiber-reinforced epoxy resin, for example, protects the cable termination 1 which is fastened to it by means of pegs 23. The member 4 contributes to the tensile strength of the joint. The part of the cable 1 emerging from the member 4 is itself protected by a conical member 5, of rubber, for example.

The device of FIG. 2A may be assembled in the following manner:

The members 5, 4 and the member 14 equipped with the member 16 are threaded onto one end of the cable 1.

The wires of the strength member 12 are cut and unwound on the outlet side of the member 16; the ring 15 is threaded on to lock the strength member wires into the conical bore in the member 14.

The ring 17 and members 18 and 20 are then fitted.

A certain length of fibers 11 is selected and the chamber 22 is then closed off using the member 21.

The fibers are pushed into the chamber 22 and coiled up.

The coating 24 is encapsulated so as to link it to the coating 13.

The member 4 and the pegs 23 are fitted.

The member 5 is attached to the member 4 with a snap-fastener action.

FIG. 2B shows a double cable termination carrying the ends of two cables 2 and 3. The cable 2 has an optical core 44 of fibers 52 protected by a strength member 46. Likewise, the cable 3 has an optical core 45 of fibers 53 protected by a strength member 47. A single connecting member 40 comprises two parallel conical bores to accommodate the ends of the wires of the strength members 46 and 47, immobilized by respective conical rings 42 and 43. Immobilization is completed by an epoxy resin encapsulation. Members 48 and 49 immobilize the wires of the strength members 46 and 47 on the inlet side of the rings 42 and 43. A member 50 closes off the two bores in watertight fashion, but leaves individual watertight passages 54 and 55 for the fibers 52 and 53, respectively. All these fibers end in a storage chamber 60. Of the fibers 52, those which are welded to fibers 53 are coiled after welding against rods 61. On the other hand, the fibers 52 and 53 which are destined to be welded to the fibers 11 pass through a conical member 56 into a storage chamber 62 formed by two conical members 63 and 64 one of which (the member 64) is screwed into the end of the member 40. The fibers from the chamber 62 pass through an insulative ceramic member 65 and end at the access cable 30. The assembly which has just been described is protected by an encapsulated coating 70 of polyethylene, for example, which is linked to the insulative coatings of the cables 2 and 3. The cable termination is protected by a glassfiber-reinforced epoxy resin member 6; it is immobilized in the member 6 by pegs 71; like the member 4, the member 6 contributes to the tensile strength of the joint. A protection member 7 which snaps onto the member 6 features a conical internal cavity the walls of which limit the curvature of the cables 2 and 3 at the outlet from the double cable termination.

The double cable termination may be assembled in the following manner:

The members 7 and 6 and the member 40 fitted with its members 48 and 49 are threaded onto the respective ends of the cables 2 and 3.

The wires of the strength members 46 and 47 are cut short and unwound on the outlet side of the members 48 and 49; the conical rings 42 and 43 are threaded on to immobilize the wires of the strength members in the conical bores in the members 14.

The member 50 is fitted. The fibers 52 which must be connected to the fibers 53 are welded at this level; their excess length is coiled against the rods 61. The other fibers 52 and 53 are threaded into the member 56 by means of the individual passages and are immobilized there by a spot of adhesive.

The member 63 is fitted, a certain length of the fibers from the member 56 is selected, the storage chamber 62 is closed off by screwing on the member 64 equipped with its insulative ceramic member 65, and the fibers are pushed back into the chamber 62.

The coating 70 is encapsulated to link it to the insulative coatings of the cables 2 and 3.

The member 6 is fitted and the double cable termination immobilized by means of the pegs 71.

The member 7 is attached to the member 6 by a snap-fastener action.

Figure 2C:
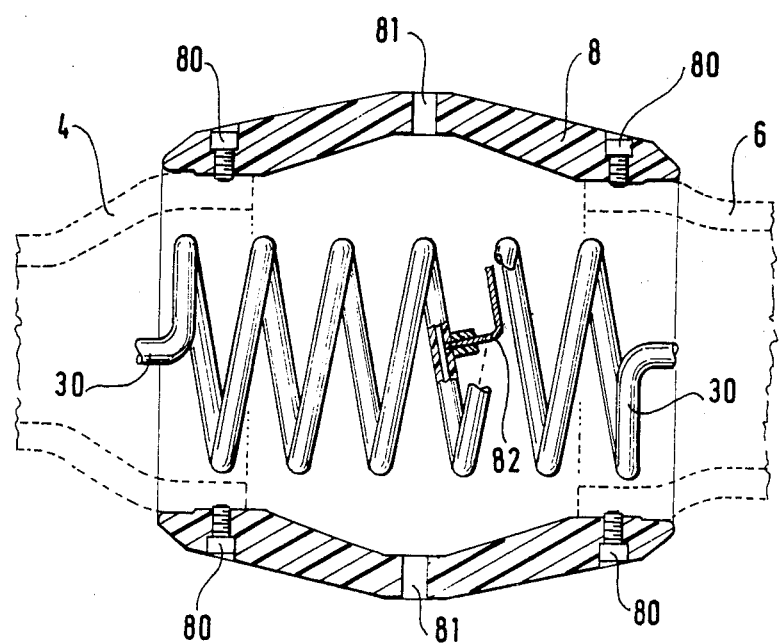

As seen in FIG. 2C, the protection members 4 and 6 are linked together by a coupling box 8; this is a glassfiber-reinforced epoxy resin member providing mechanical continuity and attached to members 4 and 6 by means of anchoring pins 80. The box comprises seawater entry holes 81. The access cable 30 is housed inside the box. The access cable comprises two portions of metal tube in which extend the ends of the fibers 11 and of the fibers 52 and 53, respectively. When the fibers have been welded together and the excess lengths have been pushed into the chambers 22 and 62, the two portions of the access cable tube are joined in a manner known per se by means of a "boat" joint; a sheath of thermoplastic material is moulded over the combination, reaching the respective coatings 24 and 70.

In this way mechanical continuity is provided between the cable 1 and the cables 2 and 3, the mechanical assembly around the joint providing tensile strength.

With regard to electrical continuity, it will be noted that the access cable comprises a sea electrode 82 in the form of a metal rod welded to the metal tube of the access cable and by means of which the cable termination carrying the cable 1 is held at the same potential as the surrounding seawater. On the same side as the cables 2 and 3 the metal tube of the access cable is insulated from the metal member 64 by a ceramic seal 65. Consequently, the cable termination carrying the cable 1 is electrically insulated from the cable termination carrying the cables 2 and 3.

It will be understood that various changes in the details, materials and arrangements of parts which have been herein described and illustrated in order to explain the nature of the invention may be made by those skilled in the art within the principle and scope of the invention as expressed in the appended claims.

For example, one cable termination could feasibly carry the ends of three or more cables. Also, the optical core of each of the cables 1, 2 and 3 could be formed by optical fibers contained in plastic tubes filled with a viscous liquid.

There is claimed:

1. Multiple joint for underwater optical fiber cables (1, 2, 3) each comprising an optical core of optical fibers (11, 52, 53), a strength member (12) of steel wires, a copper tube swaged onto said strength member and an insulative outer sheath (13), said joint comprising a first cable termination which terminates at least one cable (1), a first storage chamber (22) for storing excess lengths of fiber (11) in said first cable termination, a first connecting member (14) receiving said at least one cable through a bore therein and fastened to the end of said at least one cable (1), a first water tight member (18) closing off said bore within said first connecting member and forming a water tight passage (19) therethrough for passage of the optical fibers (11) of said at least one cable, a first hollow reinforcing member (4) concentrically surrounding said first cable termination, a second cable termination which terminates at least two cables (2, 3) disposed parallel to one another, a common connecting member (40) having parallel bores therein receiving respectively the ends of each of said at least two cables (2, 3) a second watertight member (50) closing off said parallel bores of said common connecting member (40), watertight passages (53, 54) within said second watertight member (50) receiving respective fibers (52, 53) of said at least two cables (2, 3), a second storage chamber (62) for storing excess lengths of fibers (52, 53) projecting from said second watertight member (50), a second hollow reinforcing member (6) concentrically surrounding said second cable termination, an access cable (30) incorporating fibers (11) from said first storage chamber (22) welded to fibers (52,53) from said second storage chamber (62), a watertight insulative coating (24, 70) protecting the combination of said first and second cable terminations and said access cable, and a hollow, tubular coupling box (8), and means mechanically linking opposite ends of said coupling box (8) to said first and second reinforcing members (4, 6), said coupling box (8) accommodating said access cable (30), wherein fibers of said at least one cable (1) welded to fibers of said at least two cables (2, 3) are held by said access cable and mechanically protected by said hollow, tubular coupling box.

2. Joint according to claim 1, wherein said coupling box and said first and second reinforcing members are made of glassfiber-reinforced plastic.

3. Joint according to claim 2, wherein said coupling box comprises seawater inlet holes.

4. Joint according to claim 1, wherein said access cable comprises, inside said coupling box, on inner conductor, a metal electrode welded to the inner conductor of said access cable, whereby said first cable termination is maintained at the same electrical potential as the surrounding seawater.

5. Joint according to claim 4, wherein said access cable includes a conductor tube and wherein said joint further comprises means (65) for electrically insulating said conductor tube of said access cable from one end of said second cable termination, whereby said first and second cable terminations are electrically insulated from one another.

6. Joint according to claim 1, wherein said second cable termination comprises a third storage chamber (60) adjacent the second storage chamber (62) for storing excess lengths of fiber (52, 53) and said fibers (52, 53) of said at least two cables (2, 3) are welded together after passing through said second watertight member (50) and stored in said third storage chamber (60).

7. Joint according to claim 1, further comprising a protection member (7) having a conical internal chamber, said protection member (7) being fastened to said second reinforcing member (4) and surrounding said at least two cables (2,3) where said at least two cables (2, 3) enter said second cable termination.

* * * * *